July 10, 1934.   H. R. ANDERSON   1,965,685
TRAILER COUPLER
Filed Jan. 22, 1934   3 Sheets-Sheet 2
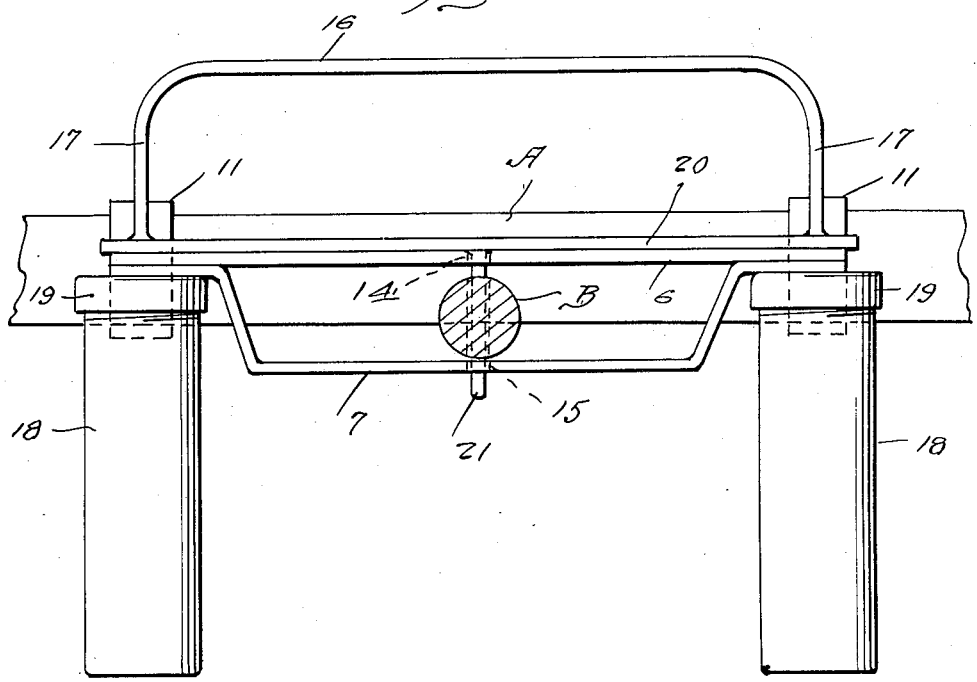
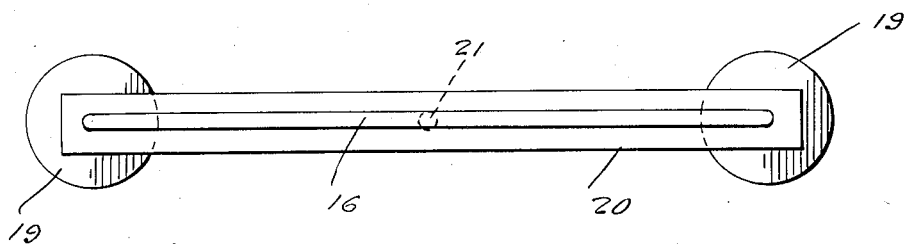
Inventor
H. R. Anderson
By Clarence A. O'Brien
Attorney July 10, 1934.  H. R. ANDERSON  1,965,685
TRAILER COUPLER
Filed Jan. 22, 1934  3 Sheets-Sheet 3

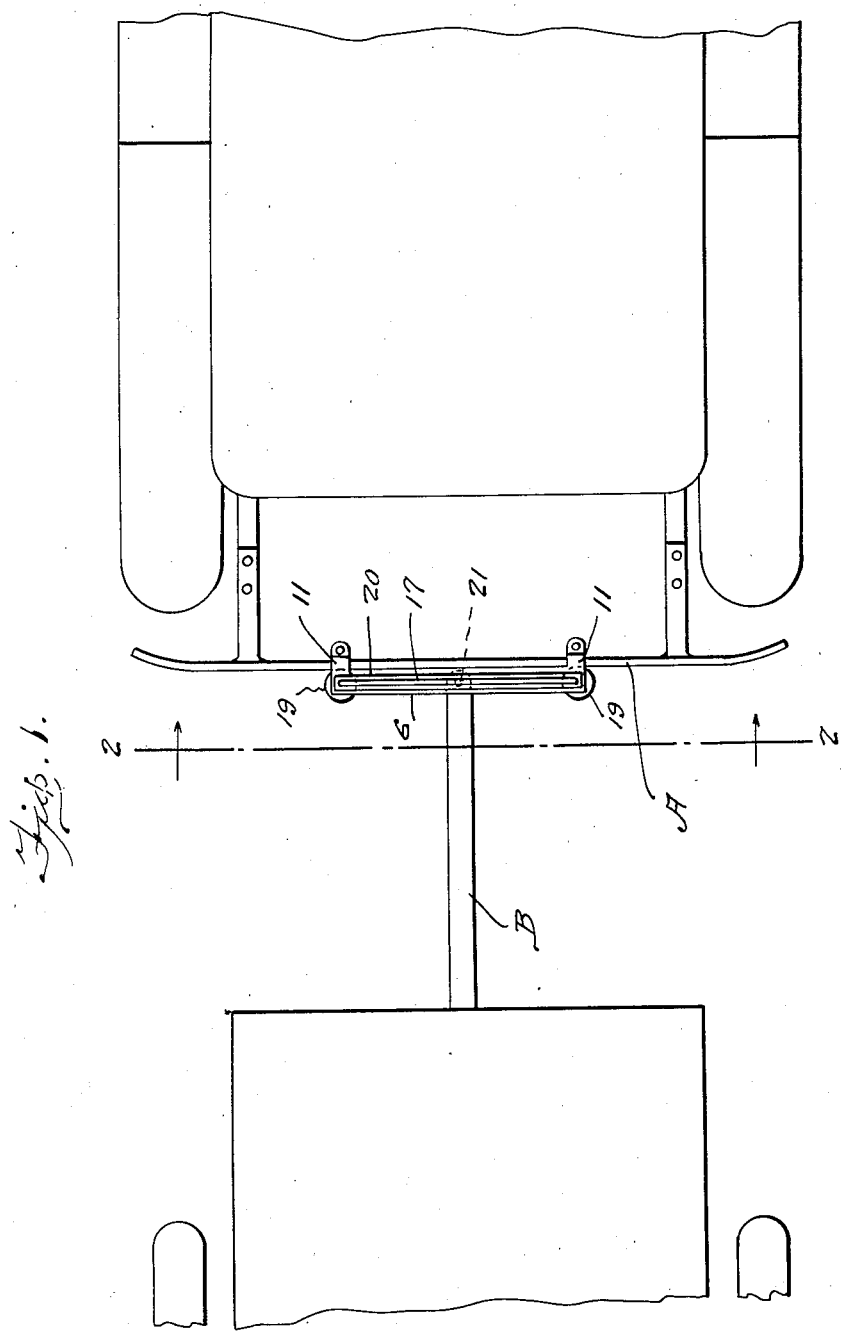

Inventor
*H. R. Anderson*

By *Clarence A. O'Brien*
Attorney

Patented July 10, 1934

1,965,685

UNITED STATES PATENT OFFICE 1,965,685

TRAILER COUPLER

Herman Raymond Anderson, Centuria, Wis.

Application January 22, 1934, Serial No. 707,835

4 Claims. (Cl. 280—33.44)

The present invention relates to a coupler for use between an automobile and a trailer and the object of the invention resides in the provision of a coupler which is easy to manipulate, safe, strong and durable, having parts which may be readily assembled and disassembled being thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a top plan view of the coupler showing the same in use.

Figure 2 is a sectional view taken substantially on the line 2—2 of Figure 1.

Figure 4 is a top plan view thereof, and

Figure 3:
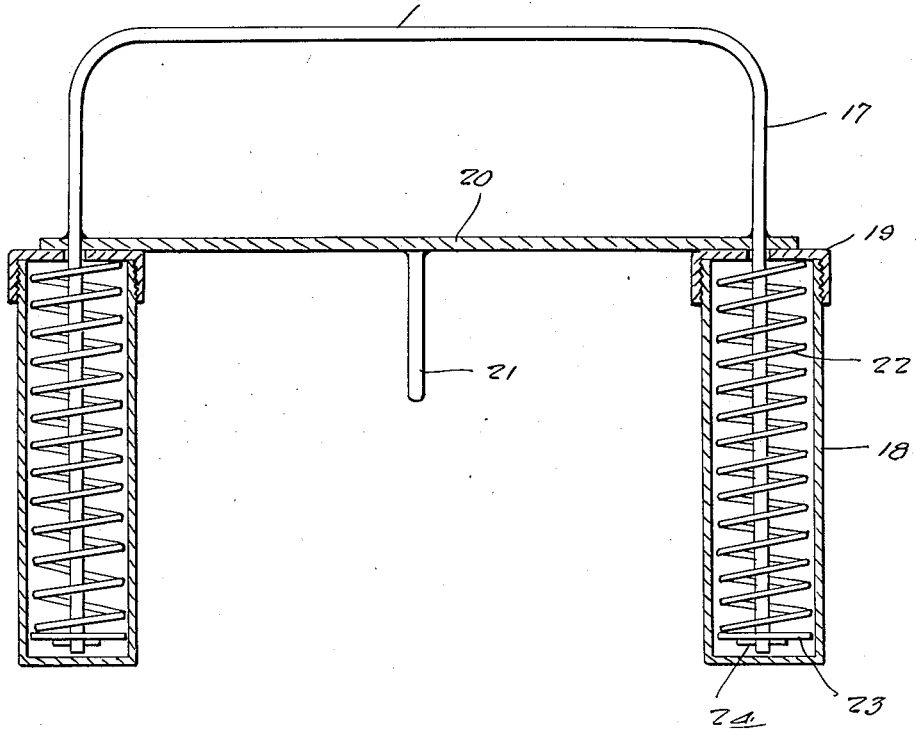
Figure 3 is a sectional view through the coupler with the frame removed.

Referring to the drawings in detail it will be seen that the letter A denotes a rear bumper and the letter B denotes the pole of the trailer. These two parts, of course, are conventional. The pole B at its end has an opening therethrough as indicated in dotted lines in Figure 2.

Figure 5:
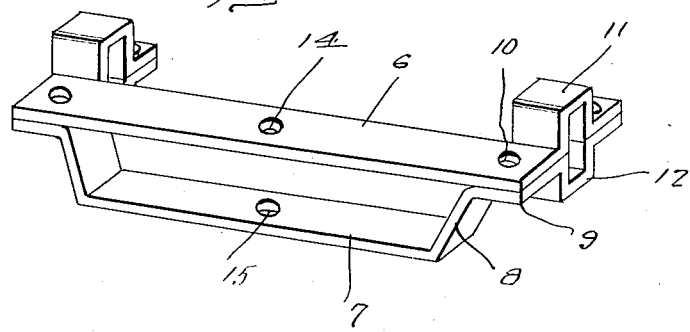
Figure 5 is a perspective view of the frame.

A frame illustrated to advantage in Figure 5 comprises an upper oblong plate 6 and a lower oblong plate 7. The plate 7 has upwardly diverging end arms 8 which merge into outwardly directed end portions 9 welded under the end portions of the plate 6 and the end portions of these two plates are provided with openings 10. Straps 11 and 12 project from the end portions of the two plates and are bent to provide clamps for attaching the frame unit to the rear bumper A. In the centers of the plates 6 and 7 are registering openings 14 and 15 respectively.

An inverted U-shaped member includes a cross portion 16 providing a handle and a pair of parallel legs 17. Cylindrical casings 18 have closed bottoms and open tops and caps 19 are threadedly engaged on these casings at their open end and have central openings through which the legs 17 extend. A plate 20 is welded or otherwise secured to intermediate portions of the legs 17 adjacent the handle portion 16 and at its center is provided with depending draw pins 21. Springs 22 are disposed about the legs 17 within the casings 18 and impinge against the cap 19 and against washers 23 abutting pins 24 extending through the ends of the legs. To assemble the coupler the casings 18 are unscrewed from the caps 19 and the springs are removed by removing the pins 24 and the washer 23. Then the caps may be slid off the legs. The legs may now be inserted through the openings 10 and the pin 21 through the openings 14 and 15. Then the springs, cap and casings are assembled as will be quite apparent. The coupler is now ready for use. By raising the handle 16 plate 20 is raised and the pin 21 is also raised. The end of the pole may now be inserted between the plates 6 and 7 and the pin 21 will project through its opening by releasing the handle. The springs 22 prevent any accidental uncoupling of the coupling. The containers 18 should be filled with oil.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A coupler of the class described including a frame unit comprising a pair of spaced members having registering openings, a pair of casings under the frame, an inverted U-shaped member having legs slidable into the casing and through openings in the frame and having a cross plate with a depending pin slidable in the first mentioned openings, and springs in the casings normally holding said pin in said first mentioned opening.

2. A coupler of the class described including a frame unit comprising a pair of spaced members having registering openings, a pair of casings under the frame, an inverted U-shaped member having legs slidable into the casing and through openings in the frame and having a cross plate with a depending pin slidable in the first mentioned openings, and springs in the casings normally holding said pin in said first mentioned opening, said frame including means whereby it may be clamped on a rear bumper.

3. A coupler of the class described comprising a frame including an upper plate and a lower plate with central registering openings, the lower plate having upstanding end arms merging into outwardly directed end portions fixed to the end portions of the top plate, said end portions having openings, an inverted U-shaped member including legs slidable through the last mentioned opening, springs on the legs, a plate across the legs and having a depending pin to project into the first mentioned opening, said springs being tensioned to hold the last mentioned plate normally in abutment with the top plate of the frame.

4. A coupler of the class described comprising a frame including an upper plate and a lower plate with central registering openings, the lower plate having upstanding end arms merging into outwardly directed end portions fixed to the end portions of the top plate, said end portions having openings, an inverted U-shaped member including legs slidable through the last mentioned opening, springs on the legs, a plate across the legs and having a depending pin to project into the first mentioned opening, said springs being tensioned to hold the last mentioned plate normally in abutment with the top plate of the frame, and casings about the springs.

HERMAN RAYMOND ANDERSON.